United States Patent [19]
Roussel

[11] Patent Number: 4,832,383
[45] Date of Patent: May 23, 1989

[54] PIPE AND FLANGE ASSEMBLY

[76] Inventor: David M. Roussel, Rte. 1, Box 675, Paulina, La. 70763

[21] Appl. No.: 197,278

[22] Filed: May 23, 1988

[51] Int. Cl.[4] .............................................. F16L 23/00
[52] U.S. Cl. ...................................... 285/416; 285/906
[58] Field of Search ......................... 285/416, 189, 906

[56] References Cited

U.S. PATENT DOCUMENTS

| | | | |
|---|---|---|---|
| 1,282,959 | 10/1918 | Sears ................................ | 285/416 X |
| 1,291,552 | 1/1919 | Kjerner . | |
| 1,807,003 | 5/1931 | Nelson ............................. | 285/416 X |
| 1,817,289 | 8/1931 | Benz . | |
| 1,836,198 | 12/1931 | Spyer . | |
| 2,157,918 | 5/1939 | Rankin ................................ | 113/112 |
| 2,208,821 | 7/1940 | Taylor ................................. | 285/111 |
| 2,669,467 | 2/1954 | Wolferz .............................. | 285/138 |
| 3,029,094 | 4/1962 | Parlasca et al. ..................... | 285/114 |
| 3,909,049 | 9/1975 | Blatnica ............................. | 285/329 |
| 4,545,605 | 10/1985 | Gerber et al. ....................... | 285/189 |

FOREIGN PATENT DOCUMENTS

| | | | |
|---|---|---|---|
| 1018681 | 10/1957 | Fed. Rep. of Germany ...... | 285/416 |
| 182259 | 1/1963 | Sweden ............................... | 285/416 |
| 335286 | 9/1930 | United Kingdom ................ | 285/416 |

*Primary Examiner*—Dave W. Arola
*Attorney, Agent, or Firm*—David L. Ray

[57] ABSTRACT

A pipe and flange assembly including a flange having a front surface and a rear surface, the flange having a substantially cylindrical aperture therethrough, the front surface of the flange being substantially planar, the rear surface of the flange having a cylindrical recessed portion therein for receipt of a pipe, the recessed portion having a chamfer extending around the circumference thereof between the recessed portion and the rear surface of the flange, a substantially cylindrical pipe seated in the recessed portion, and an interface portion connecting the pipe to the flange, the interface portion including the chamfer and weld material disposed between the pipe and the flange at said chamfer.

9 Claims, 2 Drawing Sheets

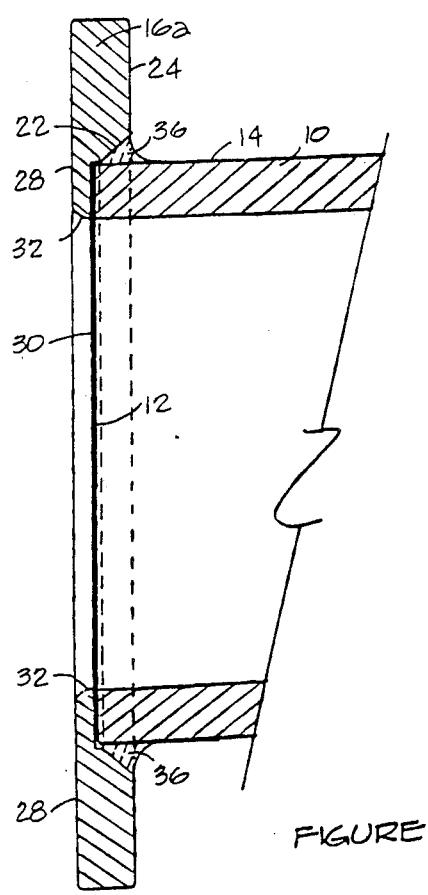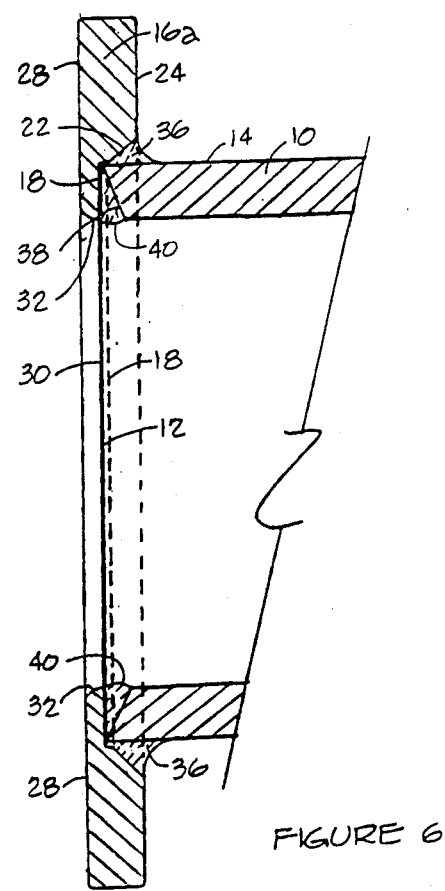
FIGURE 5
FIGURE 6

PIPE AND FLANGE ASSEMBLY

BACKGROUND OF THE INVENTION

1. Field of the Invention

The present invention relates to flanges connected to pipes, and more particularly, to pipe and flange assemblies whereby the pipe and flange are welded together.

2. Description of the Prior art

Pipe and flange assemblies are known in the art. Exemplary of various types of pipe and flange assemblies, and techniques for constructing such assemblies, are the following U.S. patents:

U.S. Pat. No. 4,545,605 discloses a technique for securing a tube to a flange including the steps of inserting the end of the tube into an aperture provided on the flange from the first side of the flange such that a portion of the tube extends at least to, and preferably beyond, the second side of the flange opposite the first side. The tube is then welded to the flange about the circumference of the tube from the second side of the flange and that portion which extends beyond the second side of the flange is removed by grinding to produce the finished product.

U.S. Pat. No. 3,909,049 discloses a welded pipe flange wherein a slip-on flange is made by forming a conventional flange having an opening therein through which the piping extends. A recess is formed in the face of the flange surrounding the opening. The recess is then filled with material fusible with the flange material so that the filler material extends beyond the face of the flange. The filler material is then machined to produce a joint surface that is raised with respect to the original flange surface. After the filler material is applied the filler material and the end of the pipe are machined in one operation to form a raised joint surface.

U.S. Pat. No. 3,029,094 discloses a flexible pipe coupling having means to accommodate radial deflections or vibrations comprising a pair of axially spaced-apart and aligned end fittings for attachment to respective sections, a flexible tube fixed to the fittings radially inwardly of the periphery of the flanges to define a fluid-carrying conduit between the fittings, a first plurality of flexible, rope-like tension accepting elements over the exterior of the tube, a second plurality of flexible rope-like tension accepting elements over the outermost portions of the first elements and progressively lenthenable and shortenable fastening devices connecting the ends of the elements to the adjacent flanges of the fitting for individually regulating the tension in the elements.

U.S. Pat. No. 2,669,467 discloses a welded tubing end construction including a tube aligned with a first open member, a flat ring having an outer diameter substantially greater than that of the tube end, positioned against the end of the tube in butt engagement therewith and provided with a medial opening for registry with the tube end opening, the inner adjacent portion of the tube and ring being welded together, a weld at adjacent external portions of the tube and ring uniting the same to define a substantially integral, continuous wall of L-shaped construction, and a strengthening band positioned on the tube in engagement with the end portion thereof and in abutment with the ring within the L-shaped wall, the end of the band being partly recessed to receive the weld at the juncture of the external portions of the tube and ring within the recess, the band being externally welded to the face of the ring, and a disc having a medial opening therethrough slightly greater than the outer diameter of the reenforcing band so that the disc may be slidably disposed on said band and against the ring in butt engagement, to enable the tube end construction to be secured to said open member.

U.S. Pat. No. 2,208,821 discloses a fitting including a bolting flange for welding to a bevelled pipe end, the latter and the flange or fitting having cooperating surfaces which facilitate proper positioning of the flange on the pipe end, while causing radial compression of the latter, during the welding operation, in amounts sufficient to accommodate lengthwise expansion of the pipe end, due to heating thereof during the welding operation, thereby avoiding breaking of the weld in whole or in part.

U.S. Pat. No. 2,157,918 discloses a straight-surfaced metallic member adapted to be maintained in a vertical position, a relative thick metallic collar encircling the member and closely fitting substantially at right angles thereto, the facing surfaces of the member and collar comprising copper, the collar having a slightly tapered passageway therethrough, the passageway having uncurved side walls and a diameter approximately that of the outside diameter of the metallic member but with a diameter of opening on the upper side appreciably in excess of the diameter of opening on the opposite side thereby forming a recess between the collar and the metallic member, and a mass of solder filling the recess and rigidly uniting the collar to the metallic member.

U.S. Pat. No. 1,836,198 discloses a pipe joint including two annular members having flanged ends adjacent and substantially parallel to each other, a ring disposed between the ends and having two substantially parallel opposite faces, with each face contacting with the flanged end of one of the members, the ring being relatively thick and having a large number of annular serrations on the faces where the faces contact with the ends, the serrations being fine compared to the thickness of the ring and closely spaced and formed of softer metal than the metal of the members, and a device for drawing the flange ends toward each other, whereby the serrations will be spread out to form a large number of tight joints between the ring and the adjacent ends of the members without deforming the body of the ring.

U.S. Pat. No. 1,817,289 discloses a flanged coupling for a conduit including a tube with a rim formed by turning the end of the tube over, a ring abutting against the rim, a flange, a welded seam between the face of the tube end and the flange, and a rim on the flange fitting over the ring.

U.S. Pat. No. 1,807,003 discloses a metal to metal joint including a pair of pipe sections, a flange carried by each pipe section, each flange comprising an annular ring having a portion arranged to abut the end of the pipe and being provided with bead portions spaced from the side of the pie for forming annular recesses, devices disposed in the recesses for welding flanges to the pipes, the opposite faces of the flanges being provided with tapered surfaces, a connecting ring provided with arcuate shaped surfaces arranged to be engaged by the tapered surfaces of the flanges, and bolts carried by the flanges for drawing the flanges toward one another whereby the ring is pressed tightly against the arcuate surfaces, thus forming a tight joint.

U.S. Pat. No. 1,291,552 discloses a pipe connection embodying a threaded pipe, a threaded flange screwed upon the pipe, a portion of the threads of the flange being cut away, and the cut away filled with metal homogeneous with the metal of the pipe and flange.

U.S. Pat. No. 1,282,959 discloses a pipe joint including a pair of pipes, a ring secured to the end of each pipe, each ring having a cylindrical bore engaging the pipe at its end portion, with such bore channeled at one side of the ring for a considerable distance, an annular mass of hard brazing material of substantially triangular form in section brazed in such channeled portion between each pipe and its ring to intimately unite the ring and pipe, one of the rings being located a short distance to the rear of the pipe end, and the other ring extending a short distance beyond its attached pipe end to permit entrance of the other pipe end, a packing member comprising a sleeve adapted to fit into each pipe bore and provide at the middle portion with an external annular flange of compressible material that projects between the abutting pipe ends inside of one of the rings, and fastening means engaging the rings to clamp the pipe extremities against the flange surrounding the sleeve.

SUMMARY OF THE INVENTION

In accordance with the present invention there is provided a pipe and flange assembly including a flange having a front surface and a rear surface, the flange having a substantially cylindrical aperture therethrough, the front surface of the flange being substantially planar, the rear surface of the flange having a cylindrical recessed portion therein for receipt of a pipe, the recessed portion having a chamfer extending around the circumference thereof between the recessed portion and the rear surface of the flange, a substantially cylindrical pipe seated in the recessed portion, and an interface portion connecting the pipe to the flange, the interface portion including the chamfer and weld material disposed between the pipe and the flange at said chamfer.

The pipe and flange assembly of the invention permits a flange to be quickly and easily connected to the end of a pipe with great accuracy and precision. The recessed portion of the flange enables the flange to be seated on the pipe quickly and at right angles to the exterior surface of the pipe.

A chamfer in the flange provides a space for receipt of a weld to secure the pipe to the flange quickly and easily. Furthermore, the chamfer aids in guiding the pipe into the recessed portion.

Utilizing the pipe and flange assembly of the present invention, flanges may be attached to pipes with superior speed, accuracy, and alignment compared to the techniques and methods utilized in the prior art.

BRIEF DESCRIPTION OF THE DRAWINGS

FIG. 5 is a cross sectional view of a pipe fitted in the flange shown in FIG. 4; and FIG. 6 is a cross sectional view of a pipe and flange assembly of a third embodiment of the invention.

DESCRIPTION OF THE PREFERRED EMBODIMENT

Figure 1:
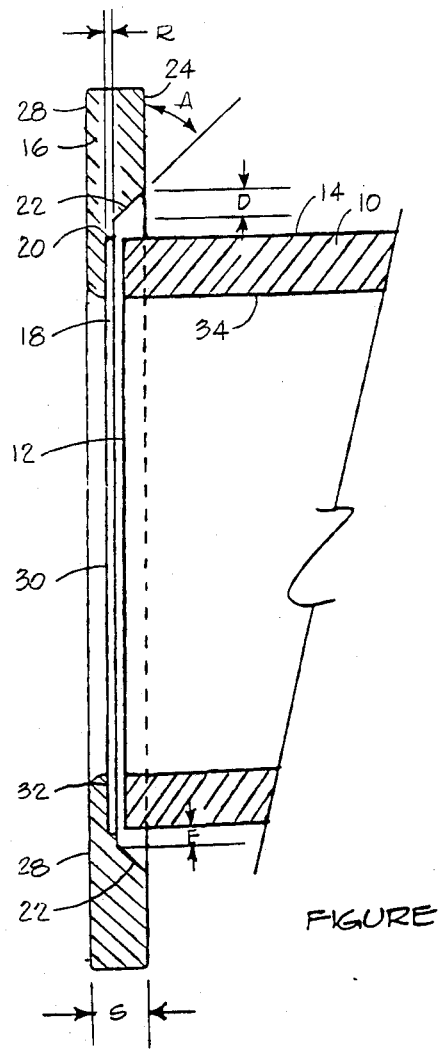
FIG. 1 partly cut-away, cross sectional view taken along lines 1—1 of FIG. 3 and shows a pipe placed in alignment with the flange prior to seating the pipe in the flange.

Referring now to the drawings, a pipe is generally indicated by the numeral 10. Pipe 10 is a conventional cylindrical pipe having an end portion generally indicated by the numeral 12 which is perpendicular to the top or outside surface of pipe 10. As shown in FIG. 1, a flange generally indicated by the numeral 16 is aligned with pipe 10 and has a recessed portion generally indicted by the numeral 18 formed therein for receipt of the end portion 12 of pipe 10.

Recessed portion 18 is generally cylindrical and has side walls 20 which have a length indicated by the letter R. Flange 16 has a width indicated by the letter S. The length R is selected sufficiently large, depending upon the diameter of pipe 10 being welded to flange 16, to enable flange 16 to be securely fitted to pipe 10 prior to welding so that flange 16 does not move relative to pipe 10 during welding of flange 16 to pipe 10. Typically, the length R may vary from about 3/32 inches to 3/64 inches for pipe having an internal diameter from about ½ inch to 24 inches. However, R may be varied as desired so long as the flange fits snugly and securely onto the end 12 of pipe 10.

The width S of flange 16 typically varies from about one quarter inch on pipe up to 5 inches inside diameter to about ⅜ of a inch on pipe up to 24 inches inside diameter. However, the dimension S may vary as desired.

Extending around the circumference of recessed portion 18 is a chamfer indicted by the numeral 22. Chamfer 22 forms a angle A with the rear surface 24 of flange 16 of preferably 45° degrees. However, angle A may vary from about 300 to about 600.

As shown in FIG. 1, at the end of chamfer 22 is vertical wall or collar 26 having a width E as indicated in FIG. 1. The distance E may be typically ⅛ inch or larger or smaller as desired in order to provide more space for weld 36.

On the front face 28 of flange 16 is an aperture 30 which preferably has a radiused periphery 32. Aperture 30 is preferably axially aligned with recessed portion 18. The radiused periphery could be deleted if desired and the periphery of the aperture 30 could be aligned with the interior surface 34 of pipe 10. Aperture 30 is preferably substantially circular. If radiused periphery 32 is deleted and the periphery of aperture 30 is aligned with the interior surface of pipe 10, aperture 30 is preferably substantially cylindrical.

Figure 2:
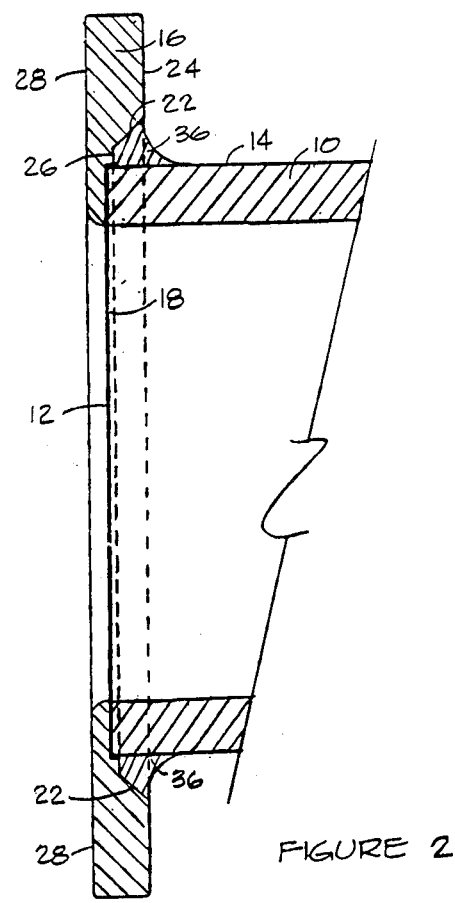
FIG. 2 is a cross sectional view taken along lines lines 1—1 of FIG. 3 with the pipe seated in the recessed portion of the flange.
Figure 3:
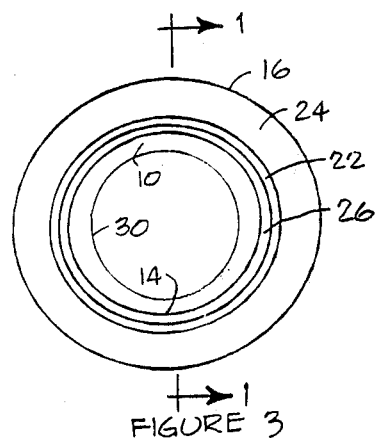
FIG. 3 is an end view of a pipe taken from the rear surface of the flange of the invention showing a pipe seated in the flange.

In FIG. 2, pipe 10 is shown forced into recessed portion 18 in flange 16 and a weld 36 placed in chamfer 22 and vertical collar 26 to form a rigid, high strength interface between flange 16 and pipe 10. Thus, pipe 10 is rigidly bonded to flange 16.

Figure 4:
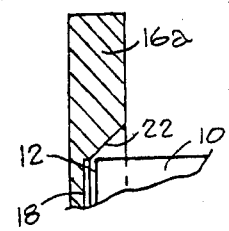
FIG. 4 is a cross sectional, partly cut-away view of an alternate embodiment of the invention.

In FIG. 4 is shown another embodiment of the invention in which chamfer 22 is utilized without collar 26. Thus, chamfer 22 slopes directly to recessed portion 18 in flange 16a. FIG. 5 shows a weld 36 joining pipe 10 to flange 16a. Elimination of collar 26 reduces the time and expense in manufacturing flange 16a.

In FIG. 6 is shown a third embodiment of the invention wherein a chamfer 38 inside pipe 10, in addition to chamfer 22 in flange 16, is formed in the end of pipe 10 which is received in recessed portion 18, and a weld 40 is placed in chamfer 38 and a weld 36 is placed in chamfer 22 to join pipe 10 to flange 16. Flange 16a in FIG. 6 has a recessed portion 18 into which pipe 10 is inserted for alignment of the flange with the pipe. The weld in chamfer 38 prevents fluids from seeping into the interface between the end portion 12 of pipe 10 and recessed portion 18.

Although the preferred embodiments of the present invention have been disclosed and described in detail above, it should be understood that the invention is in no sense limited thereby, and its scope is to be determined by that of the following claims:

What is claimed is:

1. A pipe and flange assembly comprising:
   a. a flange having a front surface and a rear surface, said flange having an aperture therethrough, said front surface being substantially planar, said rear surface having a rearwardly facing substantially cylindrical recessed portion therein for receipt of the exterior end of a cylindrical pipe, said recessed portion having chamfer means extending around the circumference thereof between said recessed portion and said rear surface of said flange, said substantially cylindrical recessed portion having sidewalls perpendicular to said front surface and a flat peripheral portion extending perpendicular to said sidewalls for abutment with the end of a cylindrical pipe inserted in said substantially cylindrical recessed portion,
   b. a cylindrical pipe extending into said recessed portion, and butting against said peripheral portion, and
   c. an interface portion connecting said pipe to said flange, said interface portion comprising said chamfer and weld material disposed between said pipe and said flange at said chamfer.

2. The assembly of claim 1 wherein said aperture is substantially circular.

3. The assembly of claim 2 wherein said recessed portion has a length of from about 3/32 inches to about 3/64 inches when the internal diameter of said pipe is from ½ inch to 24 inches.

4. The assembly of claim 1 wherein said aperture is axially aligned with said recessed portion.

5. The assembly of claim 1 wherein collar means connects said recessed portion to said chamfer means.

6. The assembly of claim 5 wherein said collar means extends perpendicularly upward from said recessed portion.

7. The assembly of claim 1 wherein said chamfer forms an angle with said rear surface of said flange of from about 30° to about 60°.

8. The assembly of claim 1 wherein said pipe has a chamfer inside the end of said pipe that is received in said recessed portion of said flange.

9. The assembly of claim 8 wherein said interface portion comprises said chamfer in said flange and weld material disposed between said pipe and said chamfer in said flange, and said chamfer inside said pipe and weld material disposed between said chamfer in said pipe and said flange.

* * * * *